Figure 1:
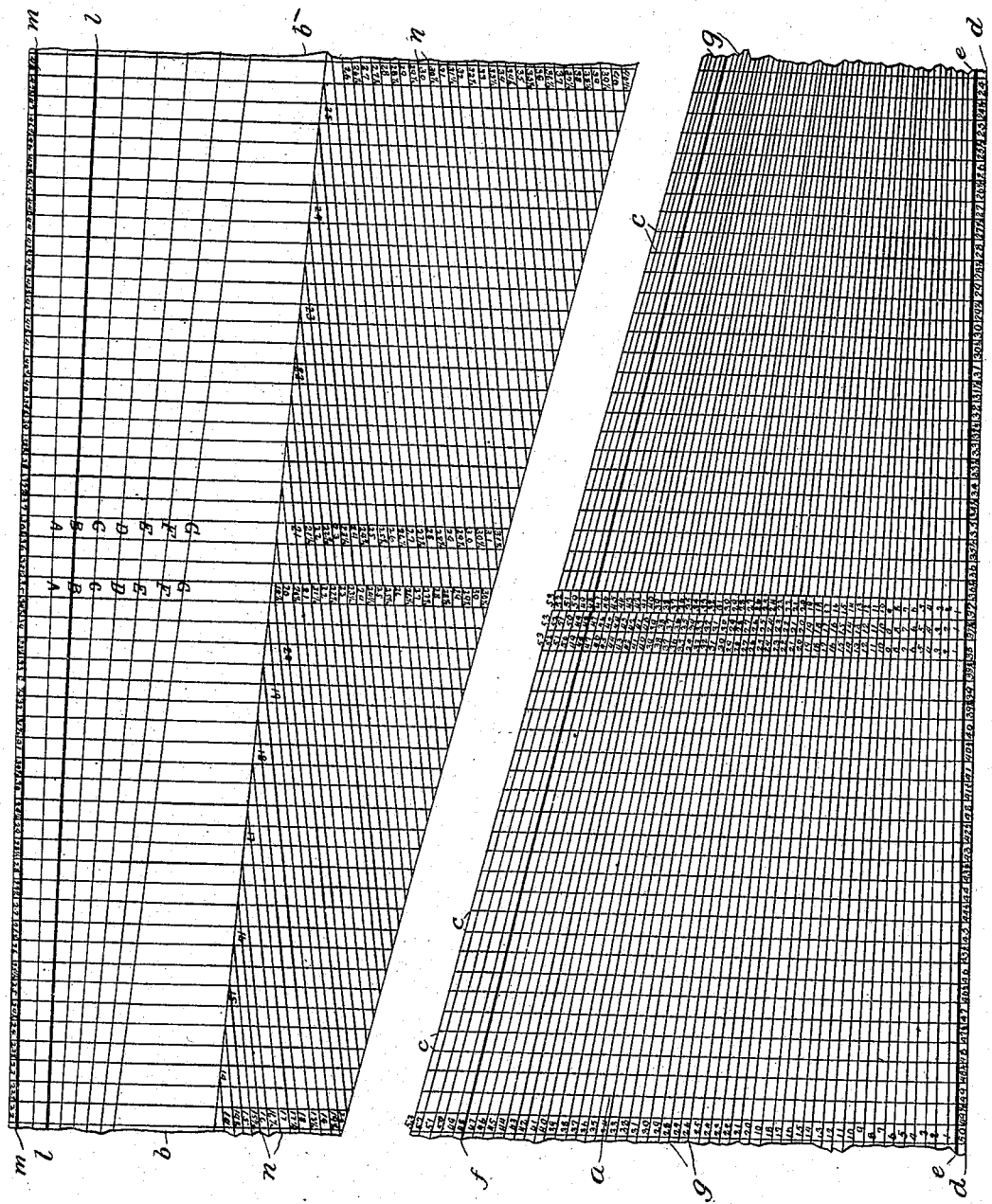

M. E. KELLOGG.
APPAREL CUTTING APPARATUS.
APPLICATION FILED APR. 9, 1908.

937,214.

Patented Oct. 19, 1909.
2 SHEETS—SHEET 1.

Witnesses
Jos. J. Collins
Joseph W. Buell

Inventor
Martha E. Kellogg
By Hugh M. Strung
Attorney

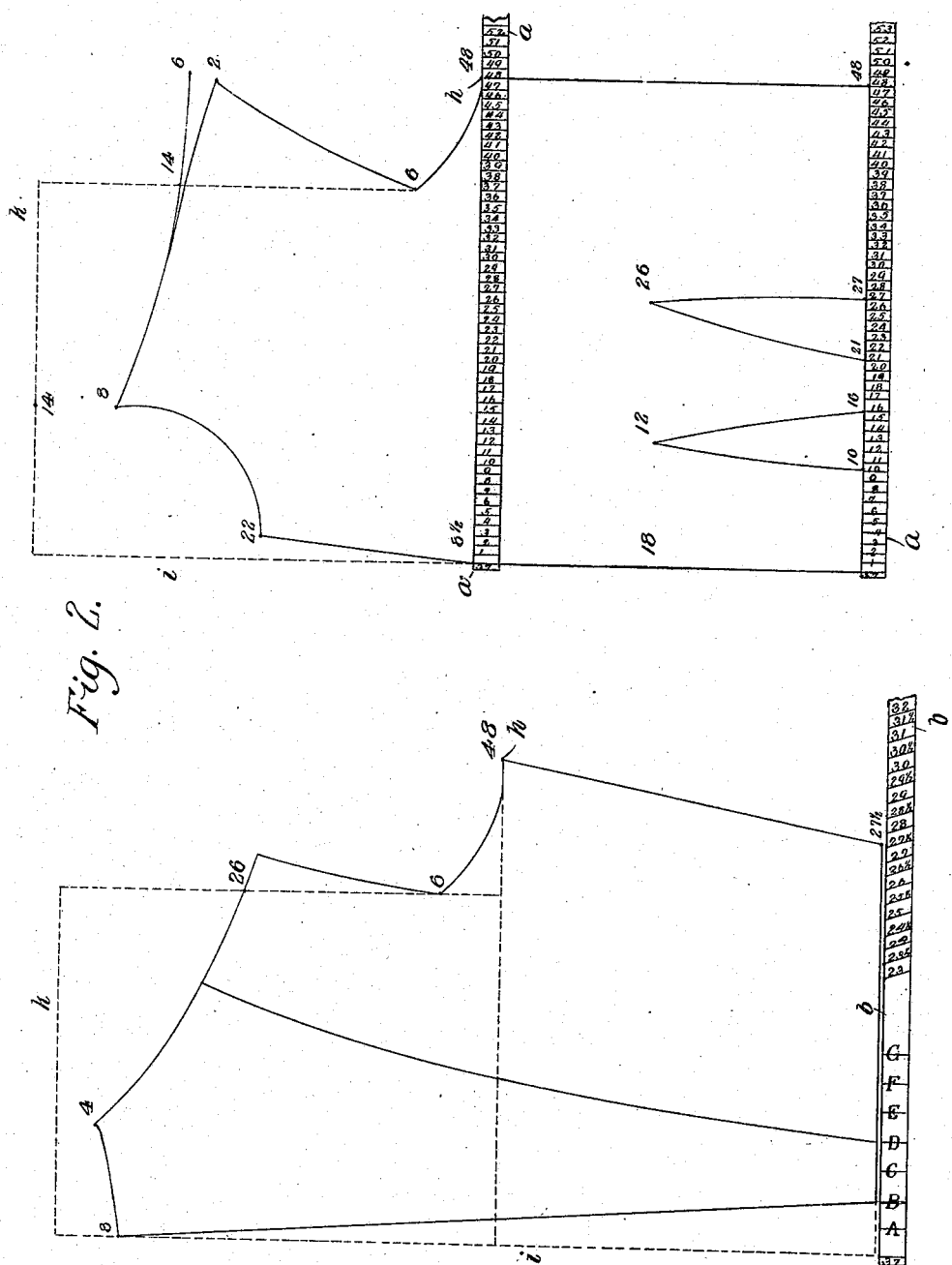

UNITED STATES PATENT OFFICE.

MARTHA E. KELLOGG, OF BATTLE CREEK, MICHIGAN.

APPAREL-CUTTING APPARATUS.

937,214. Specification of Letters Patent. Patented Oct. 19, 1909.

Application filed April 9, 1908. Serial No. 426,074.

*To all whom it may concern:*

Be it known that I, MARTHA E. KELLOGG, a citizen of the United States, residing at Battle Creek, in the county of Calhoun and State of Michigan, have invented certain new and useful Improvements in Apparel-Cutting Apparatus, of which the following is a specification.

This invention relates to improvements in measuring scales for drafting garment patterns, the object being to provide graded scales, each based on a different measurement, and preferably taken at the bust, the said scales comprising preferably two series, each scale of one series being designed for use with a scale of the other series having the same measurement indicated thereon, so that by the use of the two companion scales selected from the series, the drafting can be accomplished simply and accurately, and with economy of time and material.

The invention consists in a series of scales each designed for a given measurement which is indicated thereon, and having the divisions of each in the same proportion throughout the series, the said scales having graded divisions or spaces extending beyond the point indicating the actual measurement length of each scale in order to admit of any desired variation from the actual measure taken.

The invention also consists in providing two or more graded scales, each differing from the others as to the character and uses of their spaces or divisions, but determined with relation to a given body measurement, as for instance, a main scale for use in laying off the points of the bust line, the darts and other general points in the pattern, and a waist scale, having preferably actual waist measurements thereon, and divisions for determining the inset of the waist line for a garment of a given bust measure, said scale being based on the same bust measurement as its companion main scale.

The invention further consists in certain other novel features in the construction and arrangement of parts, all as herein after set forth, and particularly pointed out in the appended claims.

In the accompanying drawings, Figure 1, represents a scale chart having the two series of graded scales for coöperative use, and shows the manner in which the scales are graded. Fig. 2, a draft of a front section of a garment, showing the scale of a given bust measure applied, and Fig. 3, a draft of a back section of a garment, and showing the application of the waist scale.

In practicing the invention the scale chart, as shown in Fig. 1, is preferably employed, and comprises the series of scales $a$ constituting the main series, and the series $b$ constituting the series for use on the waist line of a pattern, the series $b$ being adjunctive to the main series. The main series of scales is designed to provide scales for various bust measurements, there being a scale for every bust measurement varying from 50 inches to 24 inches, as shown, each scale differing from the next preceding by an indicated length of a half inch and each scale having its bust measure indicated thereon at one end. The scale strips are formed by spaced parallel lines $c$ drawn vertically from a straight edge line $d$. Parallel to the line $d$ is drawn the line $e$ which indicates the limit of the scales at their numbered ends. As the two drafts to be made with the use of the scales are a front half section (quarter section) and a back half section (quarter section) beginning at the line $e$ there is marked off on the line $c$ one-fourth of the actual bust measurement indicated at the end of each scale strip, this being done by the heavy line $f$. Each line $c$ between the lines $e$ and $f$ is marked off into 48 equal divisions, which is accurately and conveniently accomplished by the lines $g$ which are drawn through the entire series grading each scale strip alike. Additional lines $g$ are also drawn across the strips outside of the line $f$, in order to add to the strip a number of graded spaces as shown in the completed section of the chart, it being the purpose to number each division or space of each strip throughout the entire chart. The graded spaces or divisions formed between lines $e$ and $f$ are extended beyond the line $f$ as shown, in order that in addition to the scale for the actual bust measurement indicated on each, there may be provided proper spaces for use in accurately making the correct variation from the actual or tight-fitting measurement indicated by 48, it being important to recognize that what would be a proper addition for one bust measure in order to secure a certain looseness of garment would be wholly excessive, or insufficient, for other bust measures, hence the necessity of the added graded spaces, the numbering of which continue the numerals from 48 to 53.

The application of the scales $a$ is shown in the pattern draft of Figs. 2 and 3, the scale for a bust measurement of thirty-seven inches being selected and used to get the point $h$, the pattern draft showing the usual lines $i$ and $k$ drawn by a tailor's square, and upon which the various actual measurements are indicated after the usual manner, but with the use of the scale referred to. With the exception of certain measurement and points on the waist-line, all other measurements made in determining the points of the pattern draft are by the use of the selected bust scale $a$, so that the measurements, which become well known, and which are expressed in graded spaces, will properly vary with each scale used, thus the darts for a garment of thirty-seven inch bust measure will be smaller than one for forty-eight inch bust measure though expressed in the same number of graded spaces. All the numerals used throughout the pattern draft of Figs. 2 and 3, with the exception of numeral $27\frac{1}{2}$, are those of scale $a$, the numeral $27\frac{1}{2}$ indicating the actual waist measurement of the garment to be cut from the draft, as hereinafter referred to. The series of companion scales $b$ are formed in parallel strips in the same manner as the scales $a$, beginning from line $m$ which forms a base line to correspond and register with the line $i$ of the drafting square in Fig. 3. Each of these scales has indicated at its end a bust measurement, so that for each of the scales $a$ there will be a scale $b$ having the same bust measurement indicated thereon, thus designating the pair of scales $a$ and $b$ to be made use of together. The line $l$, which is designated in each scale $b$ by the letter B, is the main line for determining the normal inset of the waist line, as illustrated in Fig. 3. Each scale $b$ has between line $m$ and the line G a graded space which is determined by marking off one-eighth of the bust measure from the line $m$ and dividing it into seven equal parts, the inset line B being the second of the division lines, the first division line A being for the purpose of indicating one-half of the normal inset of the waist line. The remaining of the seven division lines are lettered C, D, E, F, and G, as shown, and these indicate the graded spaces for getting the various widths of the center back section shown in Fig. 3 as having the width of the combined spaces C and D of the scale $b$. In addition to the foregoing provisions for determining the inset of the waist line at the center of the back, and the width of the center back piece, these scales $b$ are designed for determining the waist measurement for the draft, and indicate the waist measure, though actually is only half the waist measure, or in other words, the combined waist line of a front section and a back section of a garment after taking out for the darts. Thus each scale $b$ is provided with quarter inch divisions or spaces which represent half inches in the completed garment, and are given consecutive numbers to designate the inch and half-inch measurements indicated by each division. The actual half of the waist line represented by the scales $b$ for any given bust measurement is marked off from the inset line B and must vary with each bust measurement. This is accomplished by measuring off on any two of the scale strips $b$, the proper space to represent the waist line of a front section, and it will be found that a straight line drawn through the outer point thus ascertained will be at an inclination to the line B, and thus represent by the varying width of the space between the proportional variation of the waist line of a front section represented in the waist line measure of the scales $b$. It will be observed that the graded spaces C, D, E, F and G occupy a portion of the actual waist scale measure, it being unnecessary to indicate the waist measurements on that portion of the strip occupied by these graded spaces.

From the foregoing it will be seen that a relationship exists between both series of scales, so that with the proper bust measurement given a pair of companion scales can be selected that will meet the various requirements of drafting a pattern, without the necessity of tedious and difficult computations, and providing for the necessary variations one may desire to make. The scale chart may be used either to transfer measurements therefrom, or the proper pair of scale strips may be cut therefrom and used directly in making the pattern draft.

What I claim is:

1. A series of graded scales for drafting garment sections, each scale representing a different bust or other measurement which is indicated thereon, and comprising a designated portion corresponding to the width of the garment section for the measure indicated, in combination with a series of graded scales, each designed for use on the waist-line with a companion scale of the other series, the scales of each series being differently graded, as and for the purpose set forth.

2. A series of graded scales for drafting garment sections, each scale representing a different bust or other measurement which is indicated thereon, and comprising a designated portion corresponding to the width of the garment section for the measure indicated, and divided into a number of equal spaces, and a portion extending the number of said spaces, in combination with a series of graded scales, each scale of one series being designed for use with a companion scale of the other series and being differently graded, as and for the purpose set forth.

3. A series of graded scales for drafting garment sections, each scale representing a different bust or other measurement which is indicated thereon, in combination with a series of graded scales, each scale for use with a companion scale of the other series, the said scales of the second series having graded divisions for determining the inset of the back section of a garment on the waist-line thereof and divisions for determining the width of the back section according to a given waist measurement, as and for the purpose set forth.

4. A series of graded scales representing various measurements, in combination with a series of graded scales, each for use with one of the scales of the other series, the scales of the second series having like spaces to indicate various waist measures which are marked off thereon to make each of the said scales a continuation of its companion scale when used on the waist line with the other series, as and for the purpose set forth.

In testimony whereof I affix my signature, in presence of two witnesses.

MARTHA E. KELLOGG.

Witnesses:
HUGH M. STERLING,
GEORGE P. MONTAGUE.